(12) United States Patent
Wasson et al.

(10) Patent No.: US 9,424,058 B1
(45) Date of Patent: Aug. 23, 2016

(54) FILE DEDUPLICATION AND SCAN REDUCTION IN A VIRTUALIZATION ENVIRONMENT

(71) Applicant: Symantec Corporation, Mountain View, CA (US)

(72) Inventors: Scott G Wasson, Shrewsbury, MA (US); Alex Klimov, Waban, MA (US); Jacob J Vos, South Boston, MA (US)

(73) Assignee: Symantec Corporation, Mountain View, CA (US)

( * ) Notice: Subject to any disclaimer, the term of this patent is extended or adjusted under 35 U.S.C. 154(b) by 194 days.

(21) Appl. No.: 14/034,405

(22) Filed: Sep. 23, 2013

(51) Int. Cl.
| | |
|---|---|
| *G06F 9/455* | (2006.01) |
| *G06F 7/00* | (2006.01) |
| *G06F 17/00* | (2006.01) |
| *G06F 17/30* | (2006.01) |

(52) U.S. Cl.
CPC ............ *G06F 9/45533* (2013.01); *G06F 9/455* (2013.01); *G06F 9/45558* (2013.01); *G06F 17/3015* (2013.01); *G06F 17/30129* (2013.01); *G06F 17/30156* (2013.01); *G06F 17/30159* (2013.01); *G06F 17/30174* (2013.01); *G06F 2009/4557* (2013.01); *G06F 2009/45562* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS

| 8,413,146 | B1 | 4/2013 | McCorkendale | |
|---|---|---|---|---|
| 2010/0036889 | A1* | 2/2010 | Joshi | G06F 17/30194 707/821 |
| 2010/0138827 | A1* | 6/2010 | Frank | G06F 9/45558 718/1 |
| 2010/0205221 | A1* | 8/2010 | Shaw | G06F 17/3089 707/802 |
| 2012/0017114 | A1* | 1/2012 | Timashev | G06F 11/1469 714/15 |
| 2012/0084445 | A1* | 4/2012 | Brock | G06F 9/5077 709/226 |
| 2012/0167087 | A1* | 6/2012 | Lee | G06F 8/63 718/1 |
| 2012/0254131 | A1* | 10/2012 | Al Kiswany | G06F 17/30233 707/692 |
| 2013/0013865 | A1* | 1/2013 | Venkatesh | G06F 17/30132 711/133 |
| 2013/0097380 | A1* | 4/2013 | Colgrove | G06F 17/30159 711/118 |
| 2014/0229440 | A1* | 8/2014 | Venkatesh | G06F 17/30174 707/634 |
| 2014/0229451 | A1* | 8/2014 | Venkatesh | G06F 17/30156 707/692 |
| 2014/0229936 | A1* | 8/2014 | Gaonkar | G06F 9/45558 718/1 |
| 2014/0280664 | A1* | 9/2014 | Sengupta | H04L 67/2842 709/212 |
| 2014/0297603 | A1* | 10/2014 | Kim | G06F 17/30159 707/692 |
| 2015/0067283 | A1* | 3/2015 | Basu | G06F 3/061 711/162 |

OTHER PUBLICATIONS

Jin et al, "The Effectiveness of Deduplication on Virtual Machine Disk Images", 2009, ACM, pp. 1-12.*

* cited by examiner

*Primary Examiner* — Charles Swift
(74) *Attorney, Agent, or Firm* — Patent Law Works LLP (57) ABSTRACT

A virtual machine template is created. The template includes a file system containing files to be deduplicated across multiple virtual machines. For each file to deduplicate, a hash of the content is generated and stored in association with the file. The content of the file is moved from the virtual machine template to a file store. The entry for the file in the store is indexed according to the hash. Multiple virtual machines are created by cloning the template, each containing a copy of its file system and the hashes stored locally in association with the corresponding deduplicated files. File access operations are monitored on each one of the multiple virtual machines, and attempts to access deduplicated file are detected. In response, the corresponding locally stored hash is used to retrieve the content of the file from the central file store, and provide it to the virtual machine.

20 Claims, 4 Drawing Sheets

FILE DEDUPLICATION AND SCAN REDUCTION IN A VIRTUALIZATION ENVIRONMENT

TECHNICAL FIELD

This disclosure pertains generally to virtual machines and virtualization environments, and more specifically to enabling file deduplication and scan reduction across multiple virtual machines.

BACKGROUND

In the world of virtual computing, multiple virtual machines (VMs or guests) can be instantiated at a software level on a single physical computer (a host). In various virtualization scenarios, a software component often called a hypervisor can act as an interface between the guests and the host operating system for some or all of the functions of the guests. In other virtualization implementations, there is no underlying host operating system running on the physical, host computer. In those situations, the hypervisor acts as an interface between the guests and the hardware of the host computer. Even where a host operating system is present, the hypervisor sometimes interfaces directly with the hardware for certain services. In some virtualization scenarios, the host itself is in the form of a guest (i.e., a virtual host) running on another host. The services described herein as being performed by a hypervisor are, under certain virtualization scenarios, performed by a component with a different name, such as "supervisor virtual machine," "virtual machine manager (VMM)," "service partition," or "domain 0 (dom0)." The name used to denote the component(s) performing specific functionality is not important.

One common virtualization architecture is for a single host to contain a large number (e.g., dozens or even hundreds) of separate VMs. Although different ones of the hosted VMs can be configured differently, in many instances multiple ones each contain copies of many the same files. For example, dozens of VMs on a single host could each run the same software applications, such as a specific office suite, a given accounting package, the same development tools, etc. It is also not uncommon for multiple VMs to each have a separate copy of the same large data set.

In such instances, the duplicate copies of the files on the multiple VMs result in wasted storage space. More specifically, where multiple VMs containing the same files are running on a single host, multiple copies of the same files (including in some instances significant numbers of very large file sets) reside on the underlying storage hardware of the single host computer. In addition, scanning operations such as scanning the files to detect malware or to identify specific content involve a great deal of duplicated effort under these circumstances. This is so because scan operations targeting files on the multiple VMs on the host end up scanning multiple copies of each duplicated file residing on each separate VM. This results utilizing computing resources to repeat the same task multiple times.

It would be desirable to address these issues.

SUMMARY

Files are deduplicated across multiple virtual machines on a single host in a virtualization environment, thereby saving storage space and enabling more efficient scan operations. A virtual machine template is created describing a virtual machine in a known good state (e.g., free of malicious code). The virtual machine template includes a file system that contains files common to multiple virtual machines to be created based on the template. Instead of including a separate copy of these files on each of the multiple virtual machines, these files are deduplicated. For each specific file in the file system of the virtual machine template to deduplicate, a hash of the content is generated, and stored locally on the virtual machine template in association with the specific file, for example in a database of extended file attributes. The content of the specific file is moved from the virtual machine template to a central file store. The entry for the file in the central store can be indexed according to the hash of the content. The central file store resides independently of the virtual machine template and the multiple virtual machines, for example at a hypervisor level, on a virtual appliance on the host, on a remote server computer, etc. The content of each specific file moved to the file store is removed from the virtual machine template, for example by truncating the file on the virtual machine template to (e.g.,) zero bytes. After moving the content of the deduplicated files, the unused sectors of the file system of the virtual machine template are marked as being free, for example by being zeroed.

Multiple virtual machines are created by cloning the virtual machine template. Each one of the multiple virtual machines cloned from the virtual machine template contains a copy of its file system and a copy of the hashes stored locally in association with the corresponding deduplicated files. File access operations are monitored on each one of the multiple virtual machines cloned from the virtual machine template. Attempts to access deduplicated files are detected on the virtual machines. Recall that the content of the deduplicated files has been moved to the central file store, and is thus not present on the virtual machines. Instead, hashes are stored locally in association with these files. Thus, when an attempt to access a specific file on a virtual machine is detected, if a hash is stored locally in association with the file, it is determined that the content of the file resides in the central file store instead of locally on the virtual machine. Where this is the case, the corresponding locally stored hash is used to retrieve the content of the specific file from the central file store. To do so, a request containing the hash can be made to the central file store to access the content of the specific file. The hash is then used to locate and retrieve the content of the specific file in the central file store. The content of the file is provided back to the virtual machine, for example as a stream or by using block I/O.

In one embodiment, the file store is static. In this embodiment, when a specific one of the multiple virtual machines updates a deduplicated file, the updated file is stored on the specific virtual machine, but not in the central file store. The hash stored in association with the file is deleted from the specific virtual machine. Thus, the file update is not shared with the other virtual machines. Likewise, in this embodiment when a virtual machine deletes a deduplicated file, the hash stored in association with the file is deleted from the virtual machine, along with the entry for the file in the virtual machine's file system.

In other embodiments, the file store is dynamic. In one embodiment with a dynamic file store, when a specific virtual machine updates a deduplicated file, a delta from the original file content to the updated file content is stored in the central file store, in addition to maintaining the original file content. A hash of the updated content of the file is generated, and stored locally on the virtual machine, in association with the updated file. Such an embodiment can also implement garbage collection, by periodically scanning the central file store and each one of the multiple virtual machines cloned from the virtual machine template. Any files in the central file store that are identified as no longer being in use by any one of the multiple virtual machines are deleted from the file store.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
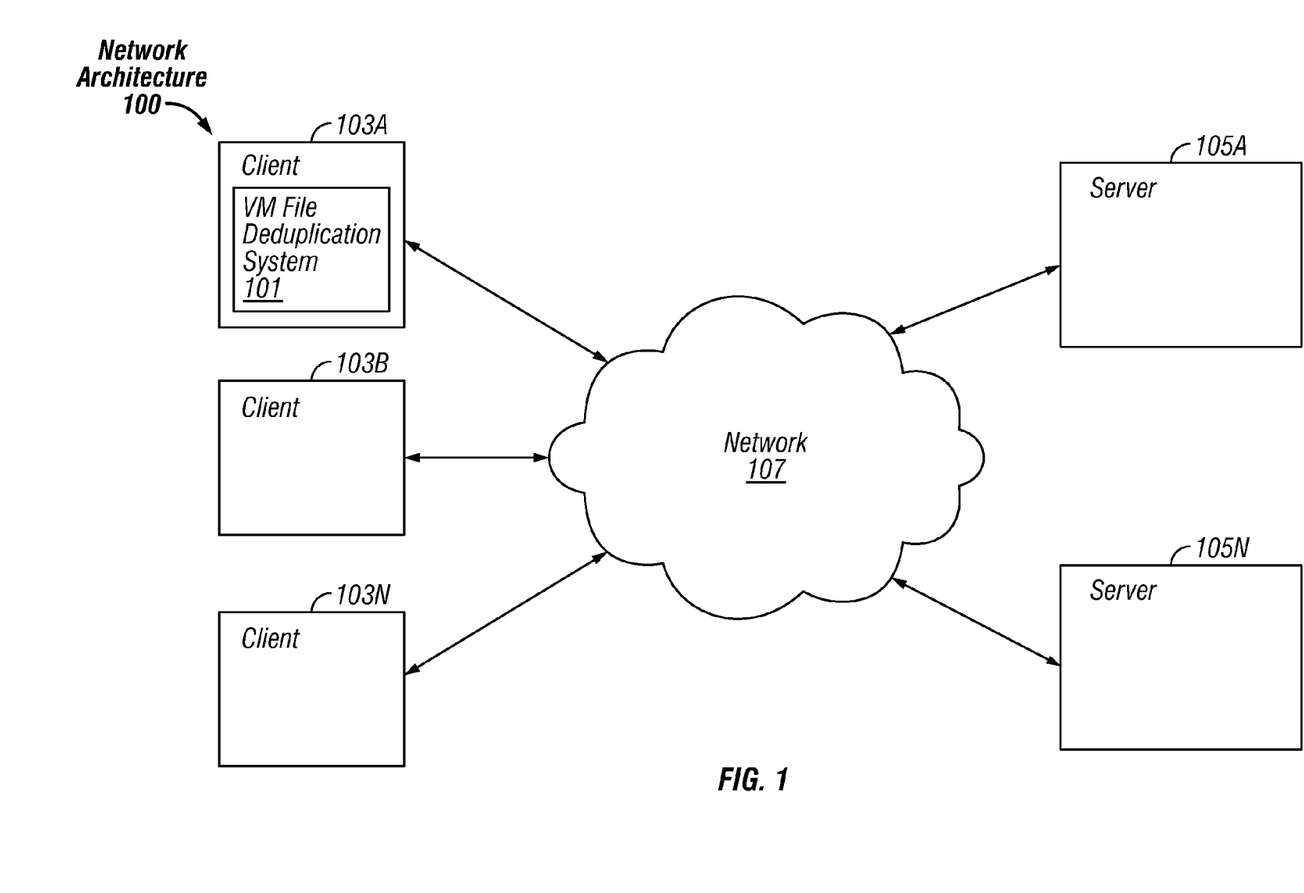
FIG. 1 is a block diagram of an exemplary network architecture in which a VM file deduplication system can be implemented, according to some embodiments.

FIG. 1 is a block diagram illustrating an exemplary network architecture 100 in which a VM file deduplication system 101 can be implemented. The illustrated network architecture 100 comprises multiple clients 103A, 103B and 103N, as well as multiple servers 105A and 105N. In FIG. 1, a VM file deduplication system 101 is illustrated as residing on client 103A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications. Such mobile computing devices are sometimes referred to as smartphones, although many mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
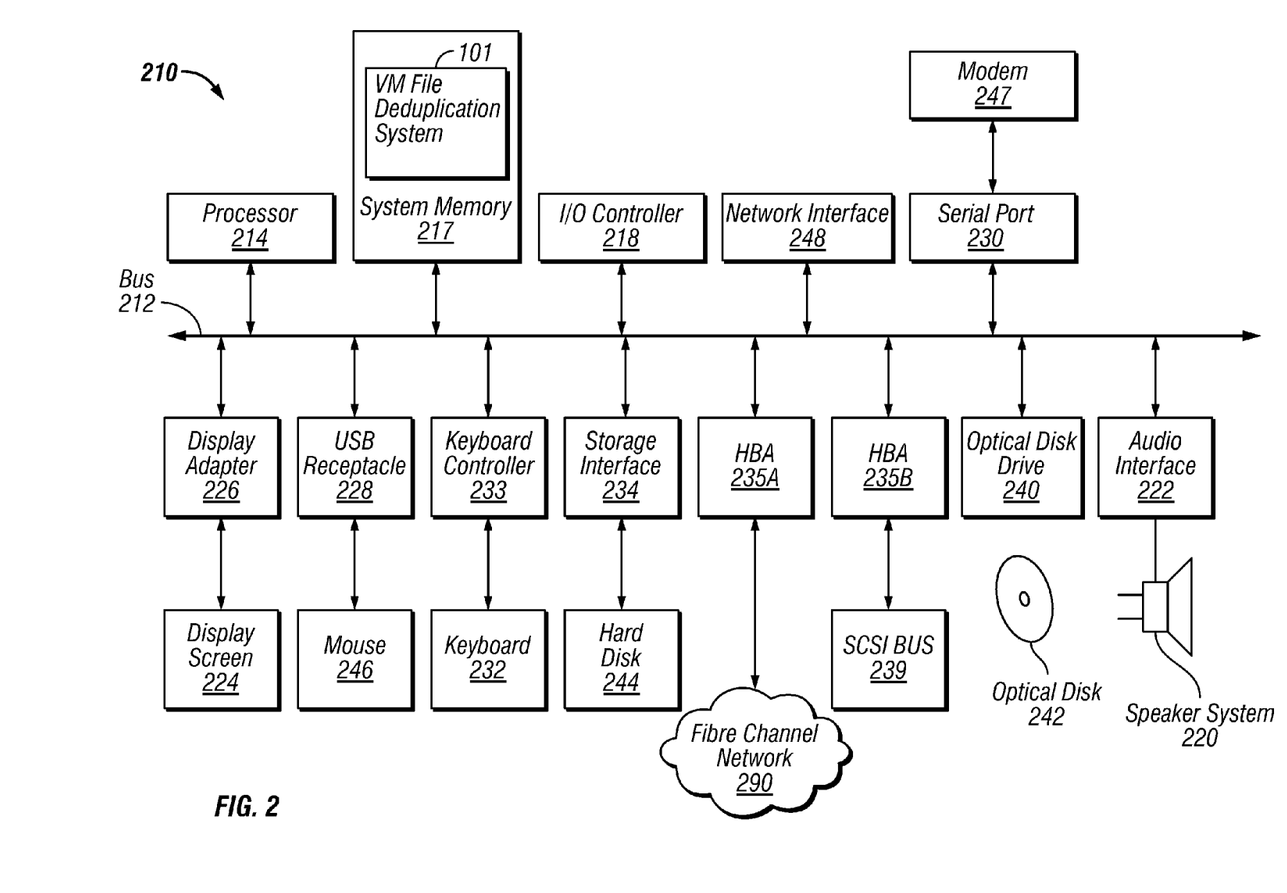
FIG. 2 is a block diagram of a computer system suitable for implementing a VM file deduplication system, according to some embodiments.

FIG. 2 is a block diagram of a computer system 210 suitable for implementing a VM file deduplication system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the VM file deduplication system 101 is illustrated as residing in system memory 217. The workings of the VM file deduplication system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
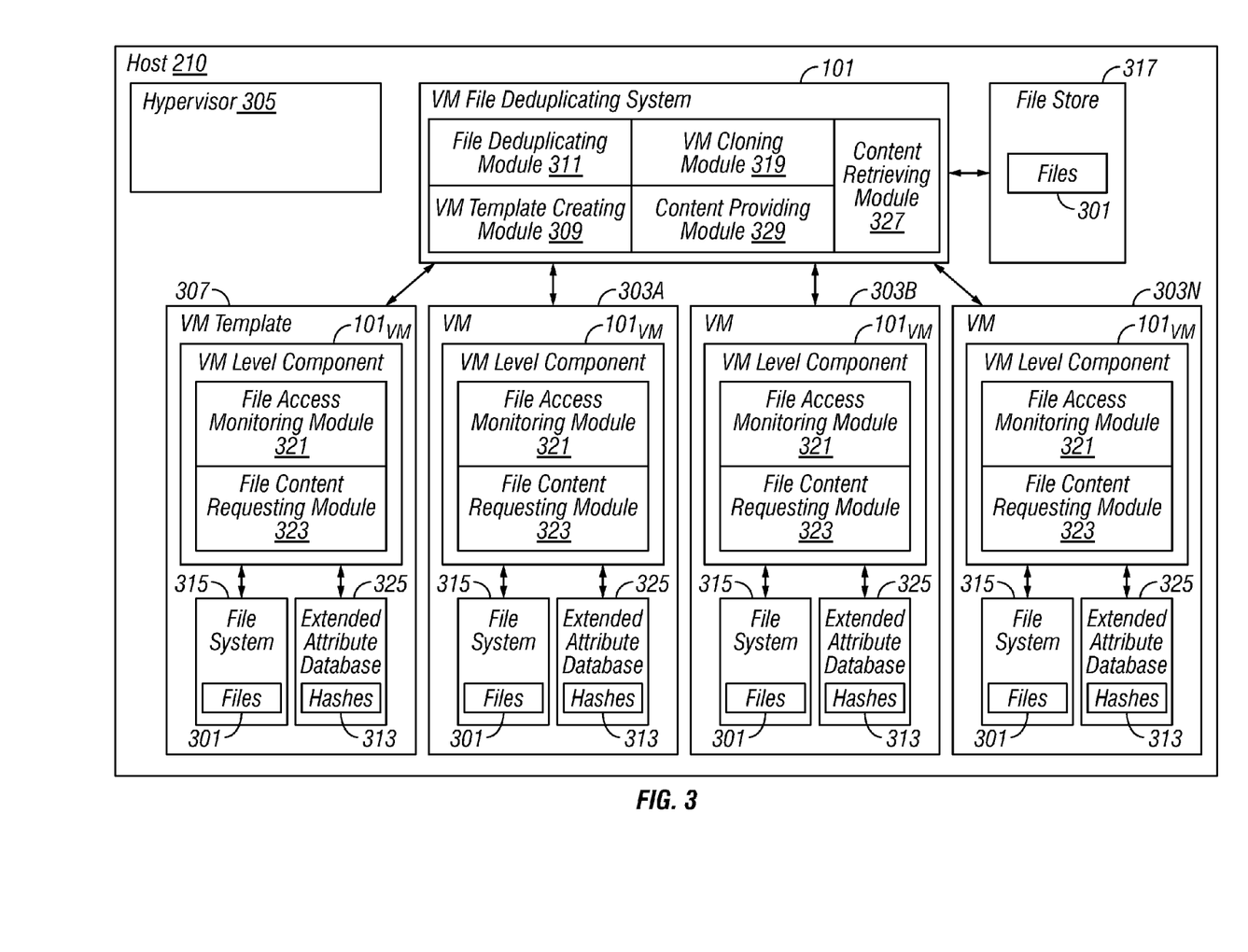
FIG. 3 is a block diagram of the operation of a VM file deduplication system, according to some embodiments.

FIG. 3 illustrates the operation of a VM file deduplication system 101, according to some embodiments. As described above, the functionalities of the VM file deduplication system

101 can reside on a client 103, a server 105, or be distributed between multiple computer systems 210, including within a cloud-based computing environment in which the functionality of the VM file deduplication system 101 is provided as a service over a network 107. It is to be understood that although the VM file deduplication system 101 is illustrated in FIG. 3 as a single entity, the illustrated VM file deduplication system 101 represents a collection of functionalities, which can be instantiated as a single or multiple modules as desired (an instantiation of specific, multiple modules of the VM file deduplication system 101 is illustrated in FIG. 3). It is to be understood that the modules of the VM file deduplication system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the VM file deduplication system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a VM file deduplication system 101 eliminates duplication of files 301 on multiple virtual machines 303 running on a single host computer 210, thereby conserving storage space and other computing resources. In the embodiment illustrated in FIG. 3, the VM file deduplication system 101 runs partially at a hypervisor 305 level, with a separate component 101$_{vm}$ running on the virtual machines 303. In different embodiments, other distributions of these functionalities are used, as described in more detail below.

As illustrated in FIG. 3, multiple virtual machines 303 and a hypervisor 305 run in the computer memory 217 of a host 210, which can be in the form of a physical computer 210, for example of the type illustrated in FIG. 2. In FIG. 3, only three virtual machines 303A, 303B and 303C are shown for illustrative purposes, but in practice many more can be deployed. Also illustrated in FIG. 3 is a virtual machine template 307, which can be cloned repeatedly to create multiple virtual machines 303. For example, the three virtual machines 303A, 303B and 303C illustrated in FIG. 3 are all clones created based on the illustrated virtual machine template 307. As discussed in more detail below, in this context a virtual machine template 307 is a special case of a virtual machine 303, from which multiple virtual machines 303 having the same basic configuration can be built. In some cases, a virtual machine template 307 is instantiated in a form that is less than a functioning virtual machine 303 itself, but is a description at a level of detail sufficient to be used as a basis for the creation of actual virtual machines 303.

More specifically, a virtual machine template creating module 309 of the VM file deduplication system 101 can create one or more virtual machine templates 307, each of which serves as a template 307 for the subsequent creation of multiple virtual machines 303 on the host 210. A virtual machine template 307 can be used efficiently as a prototype for creating a plurality of virtual machines 303 under circumstances in which the multiple virtual machines 303 are to have a working configuration with a sufficient number of files 301 in common, such as, for example, the installation of the same operating system version with at least some of the same system settings, the installation of at least some of the same software applications, the installation of device drivers in common and/or the utilization of the same data packages (e.g., a common set of enterprise data or the like).

In some embodiments, the virtual machine template creation module 309 can automatically create multiple different default virtual machine templates (e.g., a clerical work station with a standard office environment, a developer configuration with a specific integrated development environment (IDE), an accounting configuration with specific bookkeeping and accounting tools, a configuration for attorneys with stock legal research and analysis packages, etc.). In some embodiments, virtual machine templates 307 are created and/or edited based on input from a human administrator (e.g., via a graphical user interface, script, configuration file, etc.). It is to be understood that a virtual machine template 307 is a known good base state from which to clone virtual machines 303. For example, all of the files 301 on the template 307 can be scanned and ensured to be free of malware before any virtual machines 303 are created based on the template 307.

Note that each virtual machine 303 created from a single underlying template 307 has its own copy of the file system 315 of the template 307. Therefore, without the VM file deduplication system 101 providing the file deduplication described herein, each one of the virtual machines 303 would have a duplicate copy of each file 301 on the virtual machine template 307 from which it was created. Using the file deduplication functionality described herein, the VM file deduplication system 101 prevents this from occurring, thereby reducing the storage required by each virtual machine 303, as well as enabling more efficient file 301 scanning. As the term is used herein, deduplication means the prevention or elimination of duplicate copies of repeating data. Thus, file deduplication can be thought of as preventing or eliminating duplicate copies of files 301.

Note that it is typically desirable for each separate virtual machine 303 to have its own local copy of certain files 301 on the underlying virtual machine template 307. For example, in the embodiment of FIG. 3, each virtual machine has its own copy of those system files 301 used for its operating system to boot-up. That way, each virtual machine 303 is able to load itself to the point where it can properly access externally located deduplicated files 301, as described in detail below. Other non-exhaustive examples of files 301 on the virtual machine template 307 which it might be desirable for each virtual machine to store separately are small system files 301 that are accessed frequently but take up very little storage space, and user configuration files 301 which are likely to be frequently edited to contain different values on different virtual machines 303 shortly after creation. Exactly which files 301 on the virtual machine template 307 are to be deduplicated and which are to be maintained separately on each virtual machine 303 is a variable design parameter which can differ between embodiments as desired.

In order to deduplicate files 301 on the virtual machine template 307 across subsequently created virtual machines 303, a file deduplicating module 311 of the VM file deduplication system 101 generates hashes 313 of the content of those files 301 on the virtual machine template 307 which are not to be separately maintained on each of the multiple virtual machines 303. In other words, a separate hash 313 is generated of the content of each separate file 301 on the template 307 that is to be deduplicated. The deduplicating module 311 can use any suitable hashing function for this purpose. Each hash 313 is stored locally on the virtual machine template 307 in association with its corresponding file 301, as discussed in greater detail below.

For each of those files 301 on the virtual machine template 307 that are to be deduplicated, the file deduplicating module 311 moves the content of the file 301 to a central file store 317, and indexes the entries in the file store 317 according to the hashes 313 of the file content. The content of these files 301 is removed from the virtual machine template 307, for example by truncating the files 301 copied to the file store 317 to zero (or a small number such as one, five, ten, etc.) bytes on the virtual machine template 307. The central file store can be instantiated in the form of a database or other suitable storage mechanism. The file store 317 resides at a level independent of the virtual machine template 307 and independent of any specific one of the virtual machines 303 cloned therefrom. FIG. 3 illustrates a file store 317 at the level of the hypervisor 305, but other options are utilized in other embodiments as described in more detail below.

As noted above, the hashes 313 of the original content of the moved files 301 are stored locally in association with the underlying files 301 at a template 307 level, for example in a database 325 of extended file attributes as described in more detail below. As a result, the file system 315 of the virtual machine template 307 references both those files 301 for which the content is kept on the virtual machine template 307 and for those which it is not. For all of the files 301 to be deduplicated, the file content is not kept on the virtual machine template 307, although their hashes 313 are stored locally. All unused sectors on the file system 315 of the virtual machine template 307 are then marked as being free (e.g., the sectors are zeroed) to reduce the overall storage requirements.

Concerning the database 325 of extended file attributes, patent application Ser. No. 12/130,616, titled "Methods and Systems for Securely Managing File-attribute Information for Files in a File System," filed on May 30, 2008, and having the same assignee, is herein incorporated by reference in its entirety ("The File Attribute Information Application"). The File Attribute Information Application describes secure management and safe persistence of file attribute information. As described therein, metadata concerning files 301 can be safely stored as file attributes, and updated (e.g., modified and/or reset) as appropriate when the corresponding files 301 are processed and/or modified. For every file 301 in a file system 315, extended file attribute information can indicate information above and beyond what the file system 315 typically maintains, such as when a given file 301 was last scanned for malware, which version of malware definitions was used for the last scan, the results of the last scan, etc.

As described in the File Attribute Information Application, an extended file attribute information database 325 can be maintained locally on the computing device 210 containing the file system 315. The extended file attribute information database 325 can be used to track the state of the file attribute information for each file 301 in the file system 315. As file attribute information is modified and reset as described in the File Attribute Information Application, the file attribute information database 325 can be updated accordingly. In the context of the VM file deduplication system 101, when a hash 313 is generated based on the content of a given file 301 in the virtual machine template's file system 315, the hash 303 can be stored in the file attribute information database 325 as an extended file attribute of the corresponding file 301.

Returning to the discussion of the virtual machine level file deduplication, when a virtual machine 303 is created based on the virtual machine template 307, the file system 315 of the template 307, with its attributes as described above, is copied to the newly created virtual machine 303. Therefore, when multiple virtual machines 303 are created by cloning the template 307, each newly created virtual machine 303 contains its own copy of the hashes 313 of the content of the deduplicated files 301, but not the actual content of these files 301. For example as illustrated in FIG. 3, a virtual machine cloning module 319 of the VM file deduplication system 101 creates the three virtual machines 303A, 303B and 303C from the single virtual machine template 307. As a result of the functionality described above, files 301 that would otherwise be duplicated on each of the three virtual machines 303A, 303B and 303C are instead stored in the central file store 317, and each virtual machine 303 instead stores the significantly smaller hashes 313 of the content of these files 301. As described below, a virtual machine 303 can use the hashes 313 to access the content of deduplicated files 301.

As illustrated in FIG. 3 and noted above, a component $101_{vm}$ of the VM file deduplication system 101 executes at the virtual machine 303 level. The virtual machine level component $101_{vm}$ of the VM file deduplication system 101 can be instantiated in the form of, for example, a driver which is stored on the virtual machine template 307, and thus copied to each virtual machine 303 cloned therefrom. A file access monitoring module 321 of the virtual machine level component $101_{vm}$ of the VM file deduplication system 101 runs on each virtual machine 303 cloned from the template 307, and monitors file access operations on the virtual machine 303. To monitor file access operations, the file access monitoring module 321 can intercept or otherwise hook and/or wrap the relevant calls. The specific implementation mechanics to use for the monitoring varies between embodiments (e.g., system call interception, file system filter driver, etc.). Likewise, the specific access operations to be monitored can vary between embodiments, but typically the file access monitoring module 321 monitors all attempts to access content of files 301 on the virtual machine 303, such as open, seek, read, write and close operations.

When an attempt to access a file 301 on the virtual machine 303 is detected, it is determined whether the file content resides locally in the file system 315 of the virtual machine 303, or is instead located in the file store 317. This determination can be made based on whether the hash 313 corresponding to the file 301 in question is stored locally on the virtual machine 303. As noted above, the hashes 313 are stored in association with their underlying files 301, for example as extended file attributes. Thus, for any given file 301 referenced in the file system 315 of the virtual machine 303, it can be determined whether the content is stored locally or externally in the file store 317 by checking for the hash 313 (e.g., in the database of extended file attributes). If the content of the file 301 is local to the virtual machine 303, the access operation is allowed to run normally (e.g., control is returned from the wrapper to the system call). On the other hand, when the content is not present in the file system 315 of the virtual machine 303 but is instead located in the file store 317, the locally stored hash 313 corresponding to the file 301 is used to retrieve the content of the file 301 from the file store 317. More specifically, a file content requesting module 323 of the virtual machine level component $101_{vm}$ of the VM file deduplication system 101 requests the content from the file store 317, based on the corresponding hash 313. In other words, to access a file 301 that is not stored locally on the virtual machine 303, the file content requesting module 323 makes an access request containing the hash 313.

In response to such a request, a file content retrieving module 327 of the VM file deduplication system 101 uses the hash 313 as a search key to locate the content of the file 301 in the file store 317. A file content providing module 329 of the VM file deduplication system 101 then provides the content to the virtual machine level component $101_{vm}$ of the VM file deduplication system 101 in response to the request. The manner in which the file content is provided can vary, depending upon the specific attempted file access operation that resulted in the request (e.g., open, read, seek, etc.), as well as the file access mechanics of the file system 315 in question. Thus, the file content can be provided as it is accessed according to any suitable logical or physical input/output methodology such as stream or block I/O. Basically, the file content providing module 329 provides content of the file 301 from the file store 317 as the actual content of the file 301. The virtual machine level component $101_{vm}$ of the VM file deduplication system 101 receives the provided file content and in turn passes the content back to the hooked access operation on the virtual machine 303, which thus accesses the file content as if it were stored locally.

In one embodiment, if a given virtual machine 303 writes to or otherwise updates a deduplicated file 301, the modified version of the file 301 is stored locally on that virtual machine 303, but not in the central file store 317. In other words, in that embodiment the file store 317 is read only after it is initially loaded with the files 301 from the template 307 to be deduplicated. In such an embodiment, when the given virtual machine updates the file 301, the hash 313 pertaining to that file 301 in the virtual machine's database 325 of extended file attributes is deleted, thereby indicating that the file 301 is stored locally. The updated file 301 on the specific virtual machine 303 is not shared with the other virtual machines 303 on the host 210, but the original content of the file 301 as copied from the template 307 persists in the file store 317 for access by the other virtual machines 303. Likewise, if the virtual machine 303 deletes a file 301 stored in the file store 307, the virtual machine's hash 313 of the file 301 is deleted and the virtual machine's file system 315 is updated to delete the entry for the file 301, but the file content in the file store 307 is unaffected, such that the delete operation is local to the specific virtual machine 303.

Thus, in this embodiment there is a 1:1 relationship between the central file store 317 and the virtual machine template 307. In this scenario, the relevance of the central file store 317 decreases over time as the various ones of the multiple virtual machines 303 execute activity that cause their local file systems 315 to deviate from that of the underlying template 307, such as writing to files, deleting files, downloading software updates, etc.

In one embodiment, no attempt is made to reclaim space from a file 301 in the central file store 317 when all of the virtual machines 303 on the host 210 no longer reference it. This is so because individual virtual machines 303 can be taken off line as desired, or even fail unexpectedly. Without the implementation of additional functionality, the VM file deduplication system 101 would not be aware of whether a particular file 301 in the file store 317 is actually still in use by any virtual machine 303. In this embodiment, after a given amount of time, a new virtual machine template 307 (and hence a new file store 317) can be created, and new virtual machines 303 can be created based on the new template 307. The old virtual machines 303 would then be phased out, after which the old file store 317 would be taken off line. The amount of time after which to begin phasing out a given file store 317 is a variable design parameter.

In other embodiments, the file store 317 is not static. In different embodiments, the file store 317 can be dynamically updated to varying degrees to address virtual machine 303 specific file 301 updates. For example, in one embodiment, when a file 301 is modified on a virtual machine 303, the VM file deduplication system 101 checks the file store 317 to determine whether the updated version of the file 301 is already stored therein. If so, the VM file deduplication system 101 simply updates the specific virtual machine's local hash 313 for the file 301 to reflect the updated version thereof, such that the virtual machine can now access the updated version of the file 301 without storing it locally. On the other hand, if the updated version of the file 301 is not already in the file store 317, the VM file deduplication system 101 saves the content of the updated file (or the delta from the previous version), indexed on the new hash 313.

In one embodiment, the VM file deduplication system 101 does not store all local file updates in the store 317, but only those adjudicated as being sufficiently likely be used by multiple ones of the virtual machines 303. For example, operating system or application program updates likely to be rolled out across multiple virtual machines 303 such as windows security updates or Office software patches could be added to the file store 317, for example the first time one of the virtual machines 303 installs the update, or even proactively as they become available. On the other hand, when an individual virtual machine 303 modifies a file 301 in a manner not deemed to be likely to be shared by other virtual machines 303 on the host (e.g., the virtual machine 303 writes user specific settings to a configuration file 301, makes user specific updates to a text file 301, etc.), the updated content is not copied to the central file store 317, the local hash 313 is deleted on the virtual machine 303, and the modified file 301 is stored locally, as described above. Which specific updates to store centrally and which to store locally is a variable design parameter, and can be set as desired based on factors such as update and file type.

In one embodiment the VM file deduplication system 101 implements garbage collection. More specifically, the VM file deduplication system 101 can periodically scan the file store 317 and each of the associated virtual machines 303, to identify files 301 in the store 317 that are no longer in use by any virtual machine 303. These files are then deleted from the file store 317, thereby keeping the file store 317 from degrading over time. The frequency with which to perform such scans is a variable design parameter.

The VM file deduplication system 101 can also and/or instead apply other dynamic functionality to the central file store 317 in different embodiments. For example, in one embodiment each virtual machine 303 is created with an actual copy of each file 301 stored locally, and an empty extended file attribute database 325 indicating that all of the virtual machine's files 301 are local, with none in the central file store 317. In this embodiment, whenever a virtual machine 303 accesses a file 301, the VM file deduplication system 101 offloads it to file store 317. To do so, the VM file deduplication system 101 checks to see if the particular file 301 is already in the file store 317. If so, the VM file deduplication system 101 just adds its hash 313 to the virtual machine's extended file attribute database 325, and truncates the local file to 0 bytes, thereby removing the file content from the virtual machine 303. If the file 301 is not already in the file store 317, the VM file deduplication system 101 adds its content to the file store 317, in addition to adding the hash and deleting the content from the virtual machine 303. Thus in this embodiment, over time the virtual machines 303 use less local storage and the file store 317 grows. It is to be understood that these are just examples of dynamic functionality that can be applied to the file store 317 in different embodiments to account for changes in file access by virtual machines 303 over time.

As noted above, although FIG. 3 illustrates the central file store 317 being instantiated at a hypervisor 305 level, it is to be understood that the location of the file store 317 and the mechanisms used for communication between the virtual machines 303 and the file store 317 are independent of the underlying file deduplication functionality provided by the VM file deduplication system 101. Thus, the file store 317 can be implemented at other locations in different embodiments. For example, in one embodiment the central file store 317 is implemented on a stand-alone server 105 (not illustrated in FIG. 3) and the virtual machines 303 communicate with it using, e.g., TCP, FTP, or other protocols. Other possible examples include implementing the file store 307 as a virtual appliance that communicates with virtual machines 303 through the hypervisor 305, or as shared storage within a clustering system or virtualization environment.

In some embodiments, a template 307 can be used to configure physical computers 210 as opposed and/or in addition to virtual machines 303, and the VM file deduplication system 101 can provide the file deduplication functionality described herein to the physical computers 210, for example in an embodiment in which the file store 317 is in the form of a stand-alone server 105 accessible to the physical computers over a network 107.

The use of the VM file deduplication system 101 saves significant storage space, and allows much greater virtual machine 303 densities per datastore than what is possible conventionally. At the same time, because each virtual machine 303 need not have its own duplicate copy of each file 301, the VM file deduplication system 101 eliminates duplicate scanning across numerous virtual machines (e.g., scanning the files 301 for malware).

Figure 4:
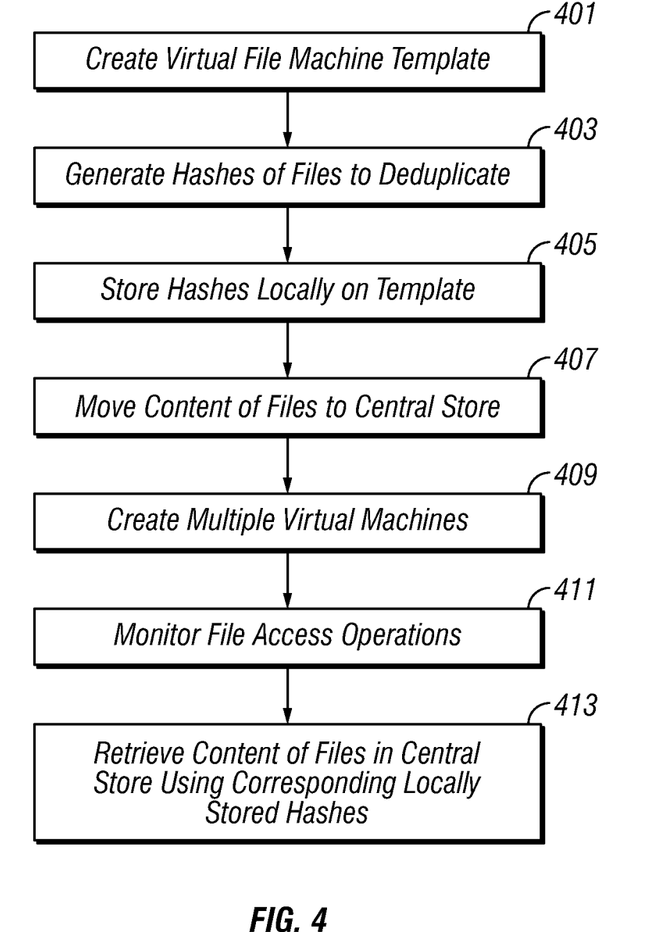
FIG. 4 is a flowchart of the operation of a VM file deduplication system, according to some embodiments.

FIG. 4 is a flowchart showing steps of the operation of the VM file deduplication system 101, according to some embodiments. The virtual machine template creating module 309 creates 401 a virtual machine template 307 on which to base multiple virtual machines 303 on the host computer 210. (The created virtual machine template 307 comprises a description of a virtual machine 303 in a known good state having a file system 315 containing at least some files 301 to deduplicate across the multiple virtual machines 303). For each specific file 301 in the file system 315 of the virtual machine template 307 to deduplicate across the multiple virtual machines 303, the file deduplicating module 311 generates 403 a hash 313 of content of the specific file 301, stores 405 the generated hash 313 locally on the virtual machine template 307 in association with the specific file 301 and moves 407 the content of the specific file 301 from the virtual machine template 307 to a central file store 317 residing independently of the virtual machine template 307 and the multiple virtual machines 303. The virtual machine cloning module 319 creates 409 multiple virtual machines 303 by cloning the virtual machine template 307. (Each one of the multiple virtual machines 303 cloned from the virtual machine template 307 contains a copy of its file system 315 and a copy of the generated hashes 313). The file access monitoring module 321 monitors 411 file access operations on each one of the multiple virtual machines 303 cloned from the virtual machine template 307. In response to detecting an attempt on a specific virtual machine 303 to access a deduplicated file 301 the content of which is in the central file store 317 and not on the specific virtual machine 303, the file content retrieving module 327 retrieves 413 the content from the central file store 317 by using the corresponding locally stored hash 313.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for enabling file deduplication and scan reduction across multiple virtual machines in a virtualization environment of a single host computer, the method comprising the steps of:

creating a virtual machine template based upon which to create multiple virtual machines on the host computer, wherein the virtual machine template comprises a description of a virtual machine in a known good state having a file system containing at least some files to deduplicate across the multiple virtual machines;

for each specific file in the file system of the virtual machine template to deduplicate across the multiple virtual machines, deduplicating the specific file by: generating a hash of content of the specific file; storing the generated hash locally on the virtual machine template in association with the specific file; and moving the content of the specific file from the virtual machine template to a central file store residing independently of the virtual machine template and the multiple virtual machines;

creating multiple virtual machines by cloning the virtual machine template, wherein each one of the multiple virtual machines cloned from the virtual machine template contains a copy of the file system of the virtual machine template and a copy of the generated hashes of the content of the deduplicated files, the copy of the hashes being stored locally on the specific virtual machine in association with the corresponding deduplicated files;

monitoring file access operations on each one of the multiple virtual machines cloned from the virtual machine template;

on each one of the multiple virtual machines cloned from the virtual machine template, in response to detecting an attempt to access a deduplicated file the content of which is in the central file store and is not present on the specific virtual machine, using a corresponding hash stored locally on the specific virtual machine in association with the specific file to retrieve the content of the specific file from the central file store;

in response to a specific virtual machine updating a deduplicated file the content of which is in the central file store and is not present on the specific virtual machine: storing the updated file on the specific virtual machine and not in the central file store; and deleting the hash stored in association with the updated file from the specific virtual machine; and in response to a specific virtual machine deleting a deduplicated file the content of which is in the central file store and is not present on the specific virtual machine: deleting the hash stored in association with the specific file from the specific virtual machine and deleting an entry for the specific file from the file system of the specific virtual machine.

2. The method of claim 1 wherein moving the content of a specific file from the virtual machine template to the central file store further comprises:
   indexing an entry of the content of the specific file in the file store according to the hash of the content.

3. The method of claim 1 wherein moving the content of a specific file from the virtual machine template to a central file store further comprises:
   removing the content from the virtual machine template by truncating the specific file on the virtual machine template.

4. The method of claim 1 wherein generating a hash of the content of a specific file and storing the generated hash locally on the virtual machine template in association with the specific file further comprises:
   storing the generated hash as an extended file attribute of the specific file, in a database of extended file attributes on the virtual machine template.

5. The method of claim 1 further comprising:
   after moving the content of each specific file in the file system of the virtual machine template to deduplicate to the central file store, marking all unused sectors of the file system of the virtual machine template as being free.

6. The method of claim 1 wherein detecting an attempt to access a deduplicated file the content of which is in the central file store and is not present on the specific virtual machine further comprises:
   detecting an attempt to access a file on the specific virtual machine; and
   determining that the content of the specific file resides in the central file store instead of locally on the specific virtual machine in response to a hash of the content of the specific file being present on the specific virtual machine.

7. The method of claim 1 wherein using a corresponding hash stored locally on the specific virtual machine in association with the specific file to retrieve the content of the specific file from the central file store further comprises:
   making a request to the central file store to access the content of the specific file, the request comprising the hash of the content of the specific file; and
   using the hash to locate and retrieve the content of the specific file in the central file store.

8. The method of claim 7 further comprising:
   providing the content of the specific file from the central file store to the specific virtual machine as a stream.

9. The method of claim 7 further comprising:
   providing the content of the specific file from the central file store to the specific virtual machine as blocks.

10. The method of claim 1 wherein the central file store residing independently of the virtual machine template and the multiple virtual machines further comprises:
    the central file store residing at a level of a hypervisor of the virtualization environment of the single host computer.

11. The method of claim 1 wherein the central file store residing independently of the virtual machine template and the multiple virtual machines further comprises:
    the central file store residing on a remote server computer and communicating with the multiple virtual machines on the host computer via a network protocol.

12. The method of claim 1 wherein the central file store residing independently of the virtual machine template and the multiple virtual machines further comprises:
    the central file store residing on a virtual appliance on the host computer and communicating with the multiple virtual machines via a hypervisor of the virtualization environment.

13. At least one non-transitory computer readable-storage medium for enabling file deduplication and scan reduction across multiple virtual machines in a virtualization environment of a single host computer, the at least one non-transitory computer readable-storage medium storing computer executable instructions that, when loaded into computer memory and executed by at least one processor of a computing device, cause the computing device to perform the following steps:
    creating a virtual machine template based upon which to create multiple virtual machines on the host computer, wherein the virtual machine template comprises a description of a virtual machine in a known good state having a file system containing at least some files to deduplicate across the multiple virtual machines;
    for each specific file in the file system of the virtual machine template to deduplicate across the multiple virtual machines, deduplicating the specific file by: generating a hash of content of the specific file; storing the generated hash locally on the virtual machine template in association with the specific file; and moving the content of the specific file from the virtual machine template to a central file store residing independently of the virtual machine template and the multiple virtual machines;
    creating multiple virtual machines by cloning the virtual machine template, wherein each one of the multiple virtual machines cloned from the virtual machine template contains a copy of the file system of the virtual machine template and a copy of the generated hashes of the content of the deduplicated files, the copy of the hashes being stored locally on the specific virtual machine in association with the corresponding deduplicated files;
    monitoring file access operations on each one of the multiple virtual machines cloned from the virtual machine template;
    on each one of the multiple virtual machines cloned from the virtual machine template, in response to detecting an attempt to access a deduplicated file the content of which is in the central file store and is not present on the specific virtual machine, using a corresponding hash stored locally on the specific virtual machine in association with the specific file to retrieve the content of the specific file from the central file store; and
    in response to a specific virtual machine updating a deduplicated file the content of which is in the central file store and is not present on the specific virtual machine: storing the updated file on the specific virtual machine and not in the central file store; and deleting the hash stored in association with the updated file from the specific virtual machine; and
    in response to a specific virtual machine deleting a deduplicated file the content of which is in the central file store and is not present on the specific virtual machine: deleting the hash stored in association with the specific file from the specific virtual machine and deleting an entry for the specific file from the file system of the specific virtual machine.

14. The at least one non-transitory computer readable-storage medium of claim 13 wherein moving the content of a specific file from the virtual machine template to the central file store further comprises:
- indexing an entry of the content of the specific file in the file store according to the hash of the content.

15. The at least one non-transitory computer readable-storage medium of claim 13 wherein generating a hash of the content of a specific file and storing the generated hash locally on the virtual machine template in association with the specific file further comprises:
- storing the generated hash as an extended file attribute of the specific file, in a database of extended file attributes on the virtual machine template.

16. A computer implemented method for enabling file deduplication and scan reduction across multiple virtual machines in a virtualization environment of a single host computer, the method comprising the steps of:
- creating a virtual machine template based upon which to create multiple virtual machines on the host computer, wherein the virtual machine template comprises a description of a virtual machine in a known good state having a file system containing at least some files to deduplicate across the multiple virtual machines;
- for each specific file in the file system of the virtual machine template to deduplicate across the multiple virtual machines, deduplicating the specific file by: generating a hash of content of the specific file; storing the generated hash locally on the virtual machine template in association with the specific file; and moving the content of the specific file from the virtual machine template to a central file store residing independently of the virtual machine template and the multiple virtual machines;
- creating multiple virtual machines by cloning the virtual machine template, wherein each one of the multiple virtual machines cloned from the virtual machine template contains a copy of the file system of the virtual machine template and a copy of the generated hashes of the content of the deduplicated files, the copy of the hashes being stored locally on the specific virtual machine in association with the corresponding deduplicated files;
- monitoring file access operations on each one of the multiple virtual machines cloned from the virtual machine template;
- on each one of the multiple virtual machines cloned from the virtual machine template, in response to detecting an attempt to access a deduplicated file the content of which is in the central file store and is not present on the specific virtual machine, using a corresponding hash stored locally on the specific virtual machine in association with the specific file to retrieve the content of the specific file from the central file store; and
- in response to a specific virtual machine updating a deduplicated file the content of which is in the central file store and is not present on the specific virtual machine: storing a delta from original content to updated content of the deduplicated file in the central file store; generating a hash of the updated content of the specific file; and storing the generated hash of the updated content on the specific virtual machine in association with the specific file.

17. The method of claim 16 further comprising:
periodically scanning the central file store and each one of the multiple virtual machines cloned from the virtual machine template;
identifying at least one specific file in the central file store that is no longer in use by any one of the multiple virtual machines cloned from the virtual machine template; and
deleting the at least one specific file from the central file store.

18. The method of claim 16 wherein moving the content of a specific file from the virtual machine template to the central file store further comprises:
- indexing an entry of the content of the specific file in the file store according to the hash of the content.

19. The method of claim 16 wherein generating a hash of the content of a specific file and storing the generated hash locally on the virtual machine template in association with the specific file further comprises:
- storing the generated hash as an extended file attribute of the specific file, in a database of extended file attributes on the virtual machine template.

20. The method of claim 16 wherein detecting an attempt to access a deduplicated file the content of which is in the central file store and is not present on the specific virtual machine further comprises:
- detecting an attempt to access a file on the specific virtual machine; and
- determining that the content of the specific file resides in the central file store instead of locally on the specific virtual machine in response to a hash of the content of the specific file being present on the specific virtual machine.

* * * * *